United States Patent
Lhymn et al.

[11] Patent Number: 6,006,774
[45] Date of Patent: *Dec. 28, 1999

[54] THERMALLY ACTIVATED PRESSURE RELIEF VALVE OR FUSE PLUG FOR PROTECTING PRESSURIZED DEVICES FROM OVER PRESSURE DUE TO FIRE

[75] Inventors: Chang Lhymn; Jane Lee Lhymn, both of Erie, Pa.

[73] Assignee: CTI Composite Products, Erie, Pa.

[*] Notice: This patent is subject to a terminal disclaimer.

[21] Appl. No.: 08/361,037

[22] Filed: Dec. 21, 1994

[51] Int. Cl.$^6$ .................................................. F16K 17/40
[52] U.S. Cl. .............................................. 137/72; 137/74
[58] Field of Search ................................... 137/72, 74, 77

[56] References Cited

U.S. PATENT DOCUMENTS

| | | | |
|---|---|---|---|
| 3,618,327 | 11/1971 | Wagner | 137/72 X |
| 4,553,589 | 11/1985 | Jennings et al. | 137/72 X |
| 5,161,738 | 11/1992 | Wass | 137/72 X |
| 5,197,671 | 3/1993 | Wass et al. | 137/72 X |
| 5,419,357 | 5/1995 | Lhymn et al. | 137/72 |
| 5,511,576 | 4/1996 | Borland | 137/72 |

*Primary Examiner*—Kevin Lee

[57] ABSTRACT

A novel PRD (pressure relief device) design called fuse plug which is creep-resistant and leakage-free is developed to improve the thermal response of PRD to fire when it is used as a temperature safety device for valves, cylinders, pressurized pipes, or any pressure vessels, the new design being the combination of geometrical configuration of PRD structure and composite technology wherein the low-melting matrix alloy is dispersed with strong/stiff reinforcing agents such as cut-wire type aggregates/cylinders and such composite alloy is contained in a threaded/rugged cavity with the length/diameter ratio being greater than a minimum. The new design employs a disc-type seal T backed by the composite alloy, thus allowing the use of this new design for cylinders of poor thermal conductivity. The trapping of the expelled alloy slug in case of fire with the straight cavity-only design is achieved by using a tee hardware having the secondary venting tube attached to its straight part of tee, the geometry of said tube being curved/angled like a snail or helix or spiral, while the branch-tee is used for the primary venting pipe connection.

18 Claims, 6 Drawing Sheets

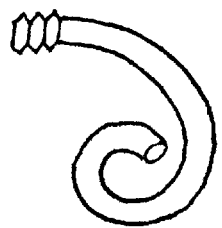
FIG. 4-A
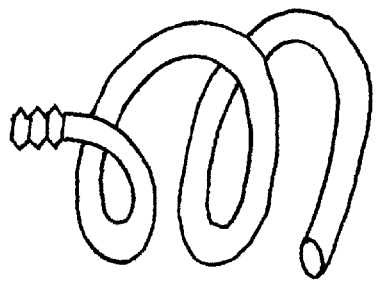
FIG. 4-B
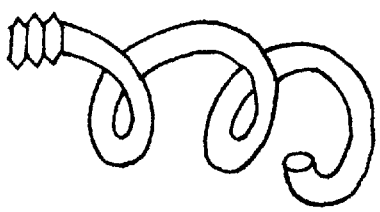
FIG. 4-C
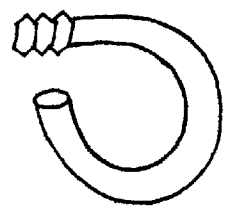
FIG. 4-D
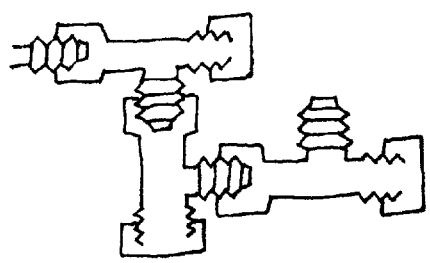
FIG. 4-E
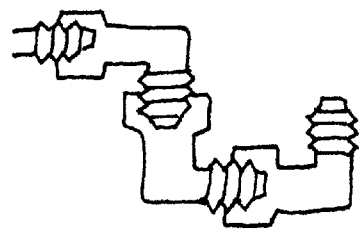
FIG. 4-F

THERMALLY ACTIVATED PRESSURE RELIEF VALVE OR FUSE PLUG FOR PROTECTING PRESSURIZED DEVICES FROM OVER PRESSURE DUE TO FIRE

BACKGROUND

The pressure relief device (PRD) having a straight cavity filled with fusible composite alloy acts as a safety device of pressure vessels in case of fire by fusing of the alloy, thus releasing the pressurized gas to prevent the explosion of pressurized vessels or any other pressurized hardwares.

To improve the safety of pressure vessels of low thermal conductivity, the response time of the fusible alloy to fire must be as short as possible. This is especially so when a composite cylinder of poor thermal conductivity such as a plastic composite cylinder comprised of a plastic liner wrapped with filaments is used as a pressure vessel. For a typical 12 inch diameter×50 inch length composite cylinder, a response time of 2 minutes or less is desired to prevent the rupture of cylinder. In order to achieve the short response time, the amount of fusible alloy sensing the heat must be small and the location of PRD must be close to the outside/external fire or heat source. The purpose of the present invention is to present a new PRD design which allows the fast response time by placing the alloy-filled cavity at the outer atmospheric region and also by reducing the volume of fusible alloy, while the flow rate is not affected or independent of the alloy volume.

When the ambient temperature rises, the metallic shell of PRD (brass, bronze, steel, or stainless steel) conducts heat fast and the PRD cavity wall becomes hot first and thus the alloy skin layer becomes hotter than the alloy core region. Like an ice falling off the container, the fusible alloy slug of cylinder shape contained in the straight cavity will be pushed/expelled out of the cavity as soon as the thin alloy layer at the cavity wall begins to fuse. This projectile must be stopped to prevent any damage/harm which could occur when the gas is vented. When a venting pipe is used in a vehicle driven by the natural gas of compressed natural gas (CNG) cylinder to vent the released gas away from the heat, such pushed/expelled alloy slug must not be trapped in the venting pipe. Very often the venting pipe is bent at several points to accommodate the specific vehicle space structure and consequently such bent spots can easily trap the expelled alloy slug, thus blocking the gas flow path and delaying the gas activation/release time. When the release time is long, the cylinder explosion could occur. What is required is a device which can trap the alloy while at the same time allowing the gas to flow. This is another objective of the present invention. The composite alloy as described in detail in prior art of Ser. No. 08/047,201, filed Apr. 16, 1993, Pat. No. 5,419,357, consists of fusible alloy matrix phase and reinforcing agents such as fibers, spherical shots, particles, random aggregates, cylinders, platelets, cubes, and any other shapes. Nickel-coated steel shot is the first candidate for mass production but the nickel coating process for prolific number of shots is very expensive and time consuming. Therefore, economical reinforcing agents are required for mass production and this is yet another objective of the present invention.

BRIEF DESCRIPTION OF THE DRAWINGS

FIG. 4 is a schematic illustration of various geometries of secondary tube configuration mountable at the end of straight part of tee.

DETAILED DESCRIPTION OF PREFERRED EMBODIMENTS

Three objectives have been presented in the preceding section and they will be dealt with in three separate sections as follows. They are the fast response time of alloy to fire, alloy slug trapping to eliminate the projectile problem, and the economical reinforcing agent for mass production.

I. Fast Response Time

Figure 1:
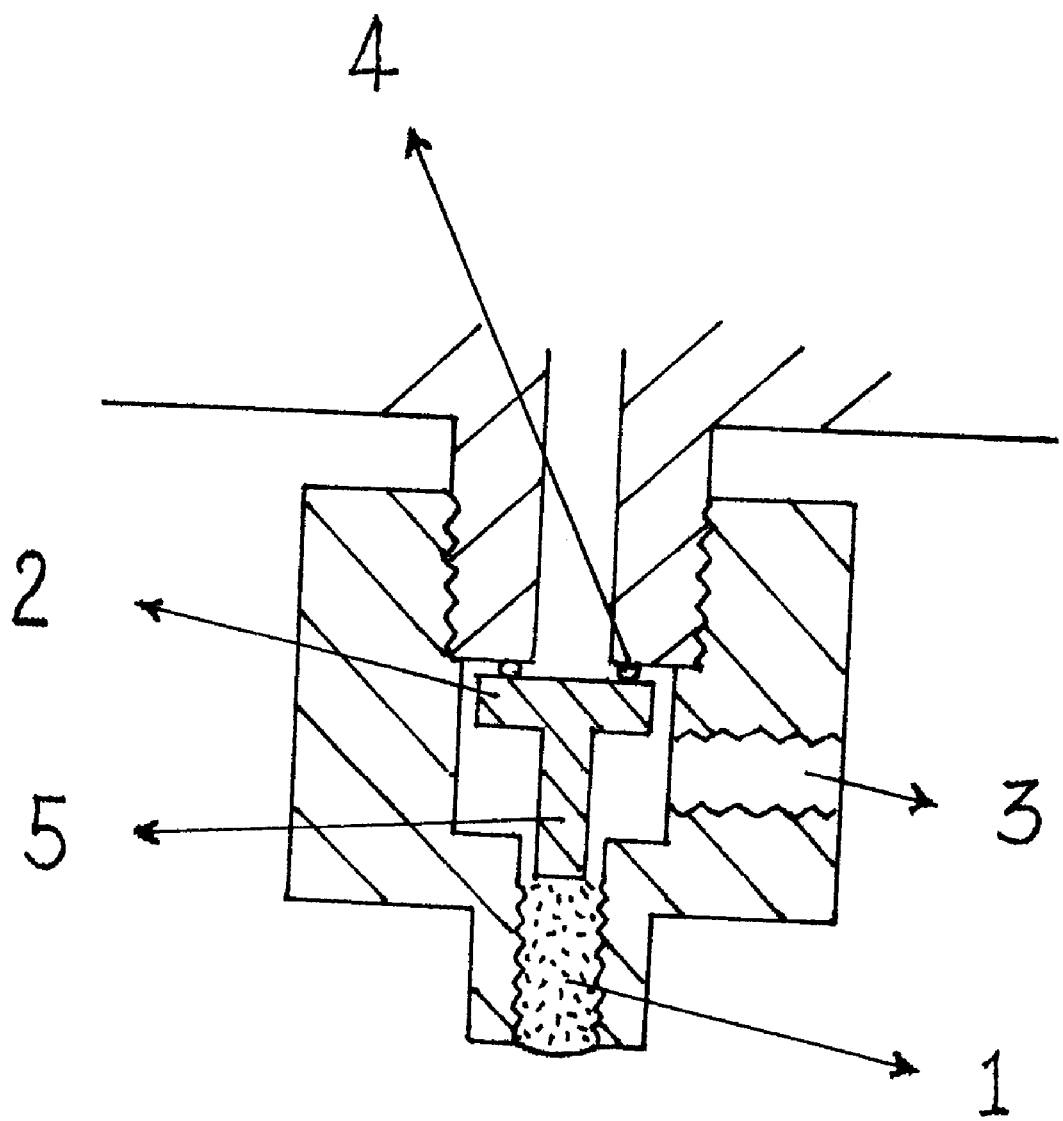
FIG. 1 is a schematic view of fuse plug design having a disc-with-stem type sealing device, seal T, in which the seal T is held tight and backed by the composite alloy in the cavity and the stem of seal T is inserted partially into the cavity. In this design only one O-ring is used for sealing.

According to a preferred embodiment shown in FIG. 1 (referred to fuse plug hereinafter), the relatively small mass of fusible alloy 1 will be melted in case of fire and subsequently the disc-with-stem shape seal-T 2 which seals the valve or cylinder body via O-ring or gasket will be pushed outward, thus venting the gas through the side port 3. The seal-T is firm and stable in its sealing engagement with O-ring 4 by having its part of stem 5 inserted into the cavity 6. As the mass of fusible alloy can be small, the activation or response time is drastically reduced. When fused, the alloy is pushed out of the cavity with the negligible momentum not to cause any damage/harm.

In order to make the seal-T stable in position, a portion of its stem is inserted into the cavity and furthermore a weak spring can be inserted between the disc of seal-T and the shoulder of cavity such that the seal-T will be forced against the shoulder of valve body. The spring force must be weak enough to vent the pressurized gas almost completely, thus eliminating any danger of cylinder explosion in case of fire.

The cavity diameter of fuse plug is desired to be small to enhance the response time of composite alloy, typically ⅛ inch. The cavity length is required to satisfy the length/diameter ratio of about 3 to meet the creep requirement as specified in CGA S.1-1, CG-9 device.

In fuse plug the applied load is carried by the composite alloy contained in the threaded cavity. The geometry of seal-T stem can be of any shape as long as it transmits the external load to the composite alloy. The stem can be bent or angled such that the cavity position can be quite flexible.

When the seal-T has an O-ring on its flat plate, the "straight thread O-ring seal" mechanism achieves the sealing, i.e., two straight male and female threads are tightened until a leakproof sealing takes place between the seal-T and the valve/cylinder body. The fast response time of fuse plug will make it an ideal device for composite cylinder of poor thermal conductivity. To further shorten the response time, the cavity part can be protruded outward from the PRD body for quick exposure to fire. The release time is determined by the diameter of venting port and a venting pipe can be connected to this side venting port.

This new PRD or fuse plug is characterized by the fast thermal response time and also fast release or venting time. The geometry of cavity can be selected from the group comprised of the straight threaded cavity, tapered and threaded cavity, stepped and threaded cavity, and any other rugged/nonslipping geometry. The mating body of seal T for sealing engagement is a valve or a cylinder or a pressurized pipe or any pressure vessels.

The basic "disc-with-stem" type seal T can be modified/changed in a variety of ways under the limitation that the seal T must be trapped inside the internal cavity space of fuse plug when it pops out when the alloy melts and also a sealing mechanism must be present between the seal T and the mating body of a valve, cylinder, or any pressure vessels. For example, the disc portion of seal T is drastically lengthened like a long rod/cylinder so that O-ring(s) mounted on this rod can seal the gas when it is located between the rod surface and the internal cavity wall while the stem part of smaller diameter rod can be backed by the alloy. Such two-concentric-cylinder type seal T can occupy the small internal space to make the overall fuse plug size quite small. The step-like shoulder part at the joining region of two concentric cylinders will make the seal T trapped inside the internal space of fuse plug when the alloy fuses, because the larger diameter cylinder cannot pass through the alloy-holding cavity the diameter of which is about equal or very slightly greater than that of the smaller diameter cylinder.

Figure 2:
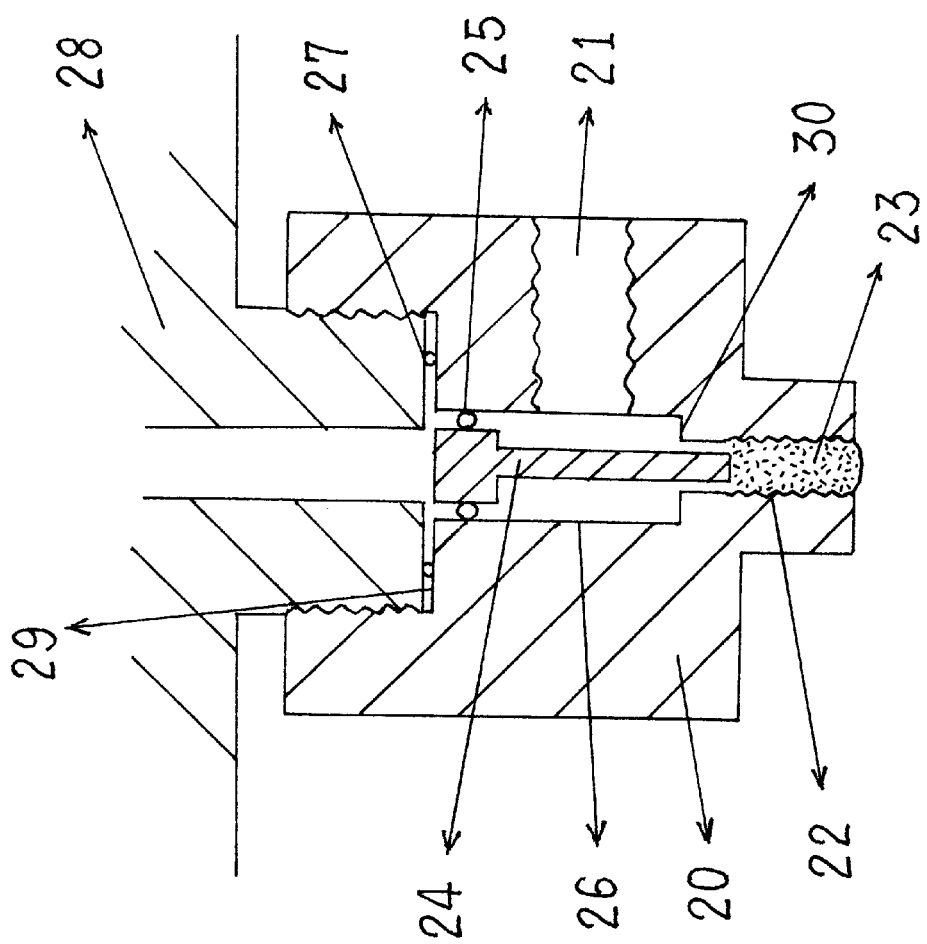
FIG. 2 is a schematic view of fuse plug design having a two-concentric-cylinder type sealing device, seal T, in which the seal T is backed by the composite alloy and two O-rings are used for sealing.

The location of O-ring can be inside the cavity of gas outlet port of the mating valve, cyliner, or pressure vessels, Or said O-ring can be inside the internal space of fuse plug by being located between the stem rod surface and the internal cavity wall. In both cases, a sealing washer/O-ring/gasket such as copper washer is used for sealing between the mating port and fuse plug neck shoulder region. With the two-concentric-cylinder type seal T, any slight depression/deformation of the alloy at the end of smaller diameter stem will not cause any leakage in the sealing engagement. FIG. 2 illustrates the two-concentric-cylinder type fuse plug, wherein fuse plug body 20 has the gas venting port 21, heat-sensitive cavity 22 which contains the composite alloy 23, seal T device 24 which seals the gas with an O-ring 25 by being located between the rod surface and the wall of internal cavity space 26 and copper washer for additional sealing. The copper washer 27 is located between the mating body 28 of a pressure vessel or valve and the shoulder 29 of fuse plug neck region. When the alloy fuses, the seal T device 24 pops out to be locked against the alloy-holding cavity shoulder 30, thus venting the gas through the venting port 21. The seal T consists of the upper rod of larger diameter than that of the lower rod and small diameter lower rod, the end portion of lower rod being partially inserted into the alloy-holding cavity 22. The diameter of the upper rod is slightly larger than the outlet port diameter of the mating body 28 in order to make the seal T stable in its sealing engagement.

II. Alloy Slug Trapping

For straight cavity, the composite alloy is expelled out of the cavity as a projectile in case of fire. The trapping of alloy can be accomplished by a tee-like hardware mounted at the exit end of PRD, said tee hardware having a branch-tee and two run-tees. One straight part of tee connected to the PRD and the expelled alloy slug will be trapped by the cap/plug/venting tube mounted at the end of another straight part of tee and the gas will be vented through the branch-tee opening. The primary venting pipe can thus be mounted at the end of branch-tee. The length of alloy trapping part of tee must be long enough for the trapped alloy not to block the branch-tee opening. When this length is not enough, the secondary venting tube attached at the end of straight part of tee will trap the alloy or reduce the alloy mementum to a safe level.

Not only tee shape but also other geometry can accomplish the trapping function as long as the alloy trapping channel which is the straight extension of PRD cavity axis and the gas flowing channel which is at an angle with respect to the alloy trapping channel of straight part of tee are separate.

The tee hardware can be a part of PRD and thus integrated into one PRD-tee unit. For example, if the cavity length/cavity diameter ratio of 3 is desired, then the overall aspect ratio (length/diameter) of 7 or 8 is chosen in such a way that there is a venting hole at the center of its length for gas venting and the end of straight PRD is plugged or capped or connected to a secondary venting tube. The side venting port can be extended/protruded further out like a tee configuration and the alloy slug will be trapped by the cap/plug/venting tube line.

As an example of gas venting for a fully pressurized 12 inch diameter×50 inch length cylinder at 3,600 psi, the typical venting time after activation is about one minute with about ¼ inch PRD cavity diameter. There is a slight possibility that some of the composite alloy trapped inside the straight part of tee may be carried away through the branch-tee during the above one minute period if the straight part of tee is capped/plugged. Although the velocity and momentum of this ejected/carried-away alloy is drastically reduced not to cause any damage, it is still desirable not to have such partial ejection of small alloy pieces/shots through the end of primary venting pipe. This matter can be solved, for example, by having a curved/angled secondary venting tube attached to the end of straight part of tee where the alloy slug is supposed to hit at the moment of gas venting initiation, said secondary venting tube being angled/bent/curved in such a geometry that the exit direction of this tube is directed to hit/land on the tee body or valve body or PRD body or its own tube or any other hard object of vehicle. The diameter of this secondary venting tube can be larger or smaller than the PRD cavity diameter so that as the expelled/trapped alloy slug melts, part of this molten slug and shots will be pushed through said venting tube, finally landing on the solid object at the exit end with a drastically reduced velocity due to its angled/curved geometry like a snail. With the snail shape of secondary tube, it is possible that that shots/particles are trapped permanently inside the tube while the molten alloy phase is leaked through.

In this "tee-secondary venting line" design, the gas is vented primarily through the branch-tee and only partially leaked through the secondary venting tube. When the cap of tee or venting tube has several holes the diameter of which is less than the shot diameter, then the molten alloy will be expelled out of the tube while the shots are trapped inside. The secondary venting tube can be replaced by other geometries such as multiple elbows or multiple tees and actually any geometry can be employed as long as the venting line is long enough to be curved/angled drastically like a snail and the exiting particles/shots land on a solid object to lose its momentum.

Figure 3:
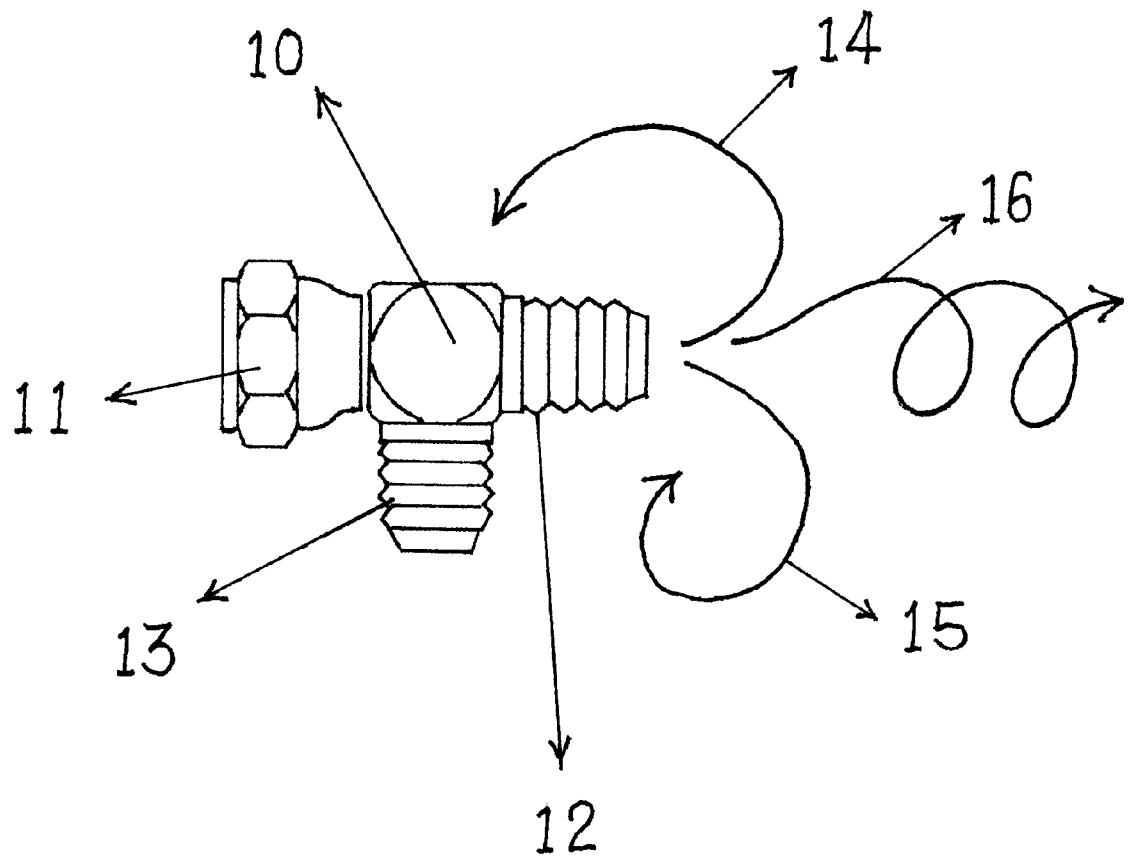
FIG. 3 is a schematic drawing of a tee hardware attached at the end of PRD as a trap for expelled alloy slug, in which the secondary venting tube is connected to the straight part of tee, secondary venting tube being bent/curved like a snail or spiral or helix to trap the alloy slug or particles/shots/reinforcing agents. The branch-tee is used for gas venting to which the primary venting pipe is connected and the other straight part of tee with swivel nut is connected to the fuse plug.

According to the preferred embodiment shown in FIG. 3, the swivel nut tee type hardware 10 consists of two straight part of tee 11 and 12 and one branch-tee 13, in which the swivel nut straight part of tee 11 is connected to the PRD exit end and the other straight part of tee 12 is either connected to the secondary venting tube as examplified in 14 and 15. The branch-tee 13 is either open or connected to the primary venting pipe. As an illustration of secondary venting tube, the design 14 is curved for its exit end to land on the tee hardware body and the example design 15 is curved like a snail to land on its own tube. The spiral geometry 16 is another tube configuration solving the projectile problem.

When the secondary venting tube is bent/curved/angled several times it its path like a snail, spiral, helix, zig-zag pattern, their combinations, or any non-straight random patterns, the reinforcing agents mostly reside in the tube or trapped quite permanently inside the tube while the molten alloy is expelled out of the tube. Even if shots/particles are not self-trapped in the multiply curved/angled tube, their exiting momentum at the tube end is negligible. The geometry of secondary venting tube is selected from the group consisting of a snail, spiral, helix, circle, multiple angles or tees, zig-zag pattern, half circle, their combinations, and any other non-straight random configurations.

When the particles/shots are expelled out of the secondary tube end to land on a solid object of vehicle, a rubber-like material can be attached on the surface of the landing object to increase the efficiency of momentum absorption.

According to a preferred embodiment shown in FIG. 4, the expelled particles/shots can be trapped or reduced to a harmless projectile by a secondary venting tube such as a snail 40, a spiral 41, a helix 42, a circle 43, multiple tees 44, and multiple angles 45.

III. Reinforcement for Mass Production

As described in detail in prior art of Ser. No. 08/047,201, the creep-free PRD has a threaded/rugged/non-slipping straight cavity filled with a composite alloy, the composite alloy being a mixture of fusible alloy matrix and strong/stiff reinforcing agents such as particles, random aggregates, fibers, spherical shots, cubes, platelets, cylinders, and any other flowable shapes. In order to avoid the void generation, the composite alloy must have a good melt-flowability without any entanglement and/or aggleromation of reinforcing agents. The length/diameter ratio of cavity must be greater than than a minimum to meet the creep strength (no extrusion/no leakage requirement) of fusible alloy, the specific value of said minimum being dependent on specific creep conditions. At least, the cavity length must be greater than the cavity diameter.

In general, short fibers tend to entangle and aggleromate, possibly inducing a poor melt flow of alloy/fiber mass to generate voids which could lead to gas leakage and/or extrusion of the composite alloy. However, when the fibers are stiff/strong and the fiber length is very short such as cut-wire shots or cut-wire shavings, the fusible alloy filled with such cut-wire type very short fibers can maintain the good melt flow behavior without any entanglement and aggleromation. The PRD cavity filled with such composite alloy can withstand the high pressure without any extrusion and without any leakage. The geometry of cut-wire type aggregates/shavings is similar to a cylinder with the top and bottom plane being irregular/random when the length/diameter ratio is larger than one. Since the cut-wire type reinforcement is made by cutting the wire of the spool, depending on the precondition of wire spool, the cut-wire cylinder axis can be straight or slightly curved or non-straight. The extremely short length of cut-wire cylinders/shavings/shots/aggregates together with their high stiffness/high strength eliminates a possibility of entanglement/aggleromation.

The content of cut-wire shot reinforcement must not be high to maintain the melt flowability. The economical cut-wire type reinforcement is made by cutting the stainless steel wire or nickel wire because of their corrosion resistance, rust-proof property, high stiffness/strength, good bondability with the matrix alloy, and relative inertness in the matrix phase alloy. The inertness of the reinfrocing agent in the matrix alloy is required to preserve the alloy chemistry intact and thus the fusing point of the alloy does not change.

The length of the cut-wire cylinder must be less than the cavity diameter for fusible alloy/cut-wire cylinder composite to fuse out of the cavity in case of fire. The ideally desirable length/diameter ratio of cut-wire cylinder is one, but other ratios can be used as long as the composite alloy is flowable not to generate voids, entanglements, and/or aggleromation.

The fusible alloy matrix phase consists of some or all the elements selected from the group consisting of tin, lead, bismuth, antimony, cadmium, indium, silver, copper, and gallium. The cut-wire shot of stainless steel are mixable with the fusible alloy by using a flux. It is mixable even without a flux if the stainless steel shot is coated with a bondable material such as nickel or tin or copper. Other cut-wire shots are mixable when it is coated with nickel or by using a flux or without a flux if the material itself is bondable such as nickel or copper shot.

The PRD shell can be made of brass, bronze, stainless steel, or any other strong materials. In case of stainless steel, nickel coating is desirable to enhance the wetting of alloy to cavity wall by a flux. The bronze material is superior to brass in stress corrosion resistance but machinability is reduced. The size of cut-wire shot must be less than the cavity diameter and the volume fraction of shot is less than the maximum limit above which the composite alloy is not flowable, thus producing voids for gas leakage. This maximum limit varies somewhat depending on the specific system but it is about 65–70 volume percent.

As a material of cut-wire shot, any bondable material can be employed such as iron, nickel, stainless steel, chromium, copper, titanium, refractory metals, their base alloys, any copper or nickel-coated metals, any copper or nickel-coated plastics, any copper or nickel-coated ceramics, and any strong plastics, ceramics or metals coated with bondable metals other than nickel or copper.

In order to enhance the wetting of the cavity wall by the alloy the PRD shell is desired to be coated with bondable metal films such as tin, nickel, chromium, titanium, zinc, gold, silver, molybdenum, bismuth, lead, antimony, copper, cadmium, their base alloys and any other bondable metals.

The PRD shell material must be strong and resistant to corrosion. Materials such as bronze, brass, stainless steel, copper, chromium, nickel, cobalt, refractory metals, their base alloys, and other strong materials resistant to stress corrosion cracking can be used.

When the cavity is filled with the alloy, a force is used by means of a vacuum, centrifugal force, or mechanical force to densify the alloy mass. Thereafter, the alloy is allowed to solidify, thus producing a dense, leakage-free structure.

Figure 5A:
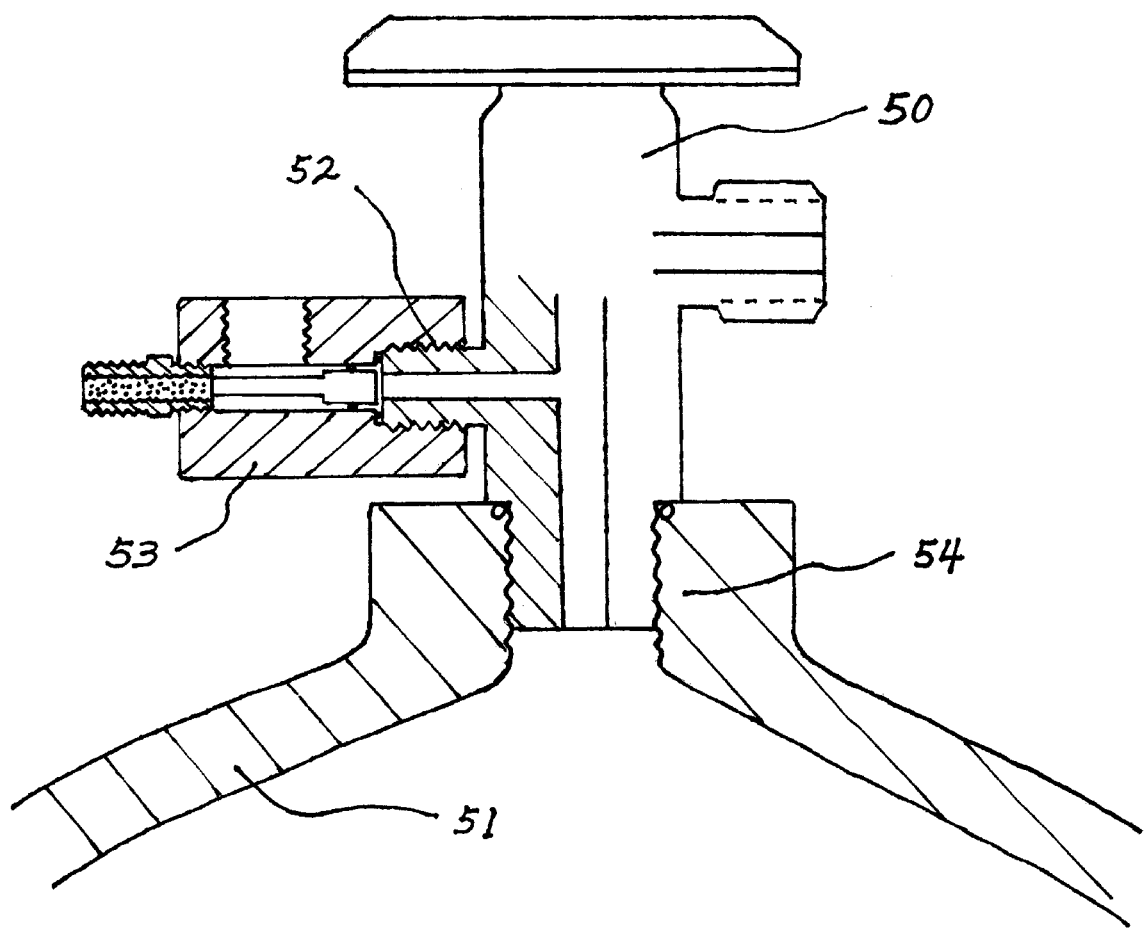
FIG. 5(A) is a block representation of a pressure vessel/valve/fuse plug assembly at the tank head region.

According to a preferred embodiment shown in FIG. 5(A), the pressure relief fuse plug apparatus 53 is attached to a valve 50 through a safety port 52. The valve 50 is mounted to a pressure vessel 51 at the pressure vessel head 54. FIG. 5(A) thus illustrates a fuse plug mounted in the pressure vessel (or tank cylinder) head region.

Figure 5B:
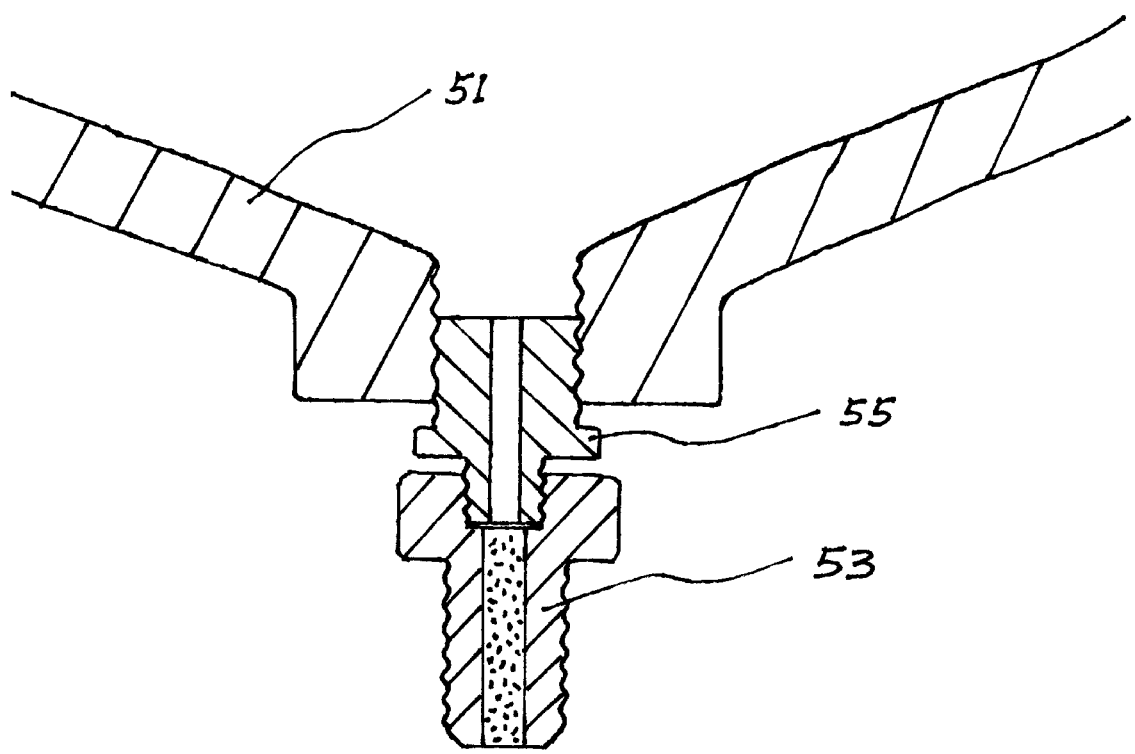
FIG. 5(B) is a schematic representation of a pressure/vessel/fuse plug assembly at the tank tail region.

The fuse plug can be installed in the pressure vessel tail region as shown in FIG. 5(B). According to a preferred embodiment shown in FIG. 5(B), the fuse plug 53 is mounted to the pressure vessel 51 via an adapter 55. When the length of a cylinder tank is long, it is desirable to mount the fuse plug both at the cylinder head and at the tail region for fire safety.

EXAMPLE 1

Cut-wire stainless steel shots of about 0.4–0.5 mm in diameter were mixed with the fusible alloy under agitation using a flux. The shot content was about 35 to 50 weight %. The brass plug cavity is straight threaded with the L/D ratio of about 3 and the brass body is coated with tin. The cavity was filled with the composite alloy and the kinds of matrix alloy are:

(a) 56 wt. % Bismuth, 22 wt. % Lead, and 22 wt. % Tin
(b) 50 wt. % Bismuth, 30 wt. % Lead, and 20 wt. % Tin
(c) 46 wt. % Bismuth, 34 wt. % Lead, and 20 wt. % Tin
(d) 45 wt. % Bismuth, 35 wt. % Lead, and 20 wt. % Tin
(e) 52.2 wt. % Bismuth, 37.8 wt. % Lead, and 10 wt. % Tin
(f) 54.5 wt. % Bismuth, 39.5 wt. % Lead, and 6 wt. % Tin
(g) 53.75 wt. % Bismuth, 43.1 wt. % Lead, and 3.15 wt. % Tin
(h) 50 wt. % Bismuth, 24.95 wt. % Lead, 12.5 wt. % Tin, 12.5 wt. % Cadmium, and 0.05 wt. % silver
(i) 50 wt. % Bismuth, 25 wt. % Lead, 12.5 wt. % Tin, and 12.5 wt. % Cadmium
(j) 51.08 wt. % Bismuth, 39.8 wt. % Lead, 8.12 wt. % Cadmium, and 1 wt. % Indium
(k) 57.42 wt. % Bismuth, 1 wt. % Lead, and 41.58 wt. % Tin
(l) 5 wt. % Bismuth, 32 wt. % Lead, and 45 wt. % Tin

EXAMPLE 2

Nickel shots or cut-wire nickel aggregates were mixed with the fusible alloy of example 1 using ammonium chloride as a flux or without a flux. The content of aggregates/shots is about 35 to 50 weight % and the nickel-coated stainless steel PRD has a threaded straight cavity with the length/diameter ratio of about 3.5. The PRD installation to the valve or cylinder was done with tee hardware attached at the end of PRD and the secondary venting tube was connected to the straight part of tee while the branch-tee was open. In the first configuration the tube was bent like a snail for its exit ent to be normal to the tee body and in the second configuration, the tube is bent like a spiral loop. The third PRD has the straight part of tee capped with the steel cap which has several small holes, the diameter of holes being less than the aggregate size. The pressurized PRD-tee-tube/cap combination was tested using a torch by heating the PRD and all the geometry (snail, spiral, and cap) were effective as an alloy trap.

EXAMPLE 3

A fuse plug with the seal T backed by the composite alloy filling the threaded straight cavity was made to shorten the activation time, the seal T stem being partially inserted into the cavity. the alloy-filled cavity diameter is ⅛ inch the alloy-filled portion has the length/diameter ratio of 3.0 to 3.5. The straight cavity was filled with the fusible alloy of example 1 reinforced with nickel shots or cut-wire stainless steel shots.

What is claimed is:

1. A thermally activated pressure relief fuse plug apparatus for protecting a pressure vessel or any pressurized hardwares, the fuse plug apparatus comprising:

a fuse plug housing having a gas venting port and further having a hollow internal space and also having a cavity containing a fusible composite alloy and also having a threaded neck opening for engagement with a pressure vessel, or a valve attached to said pressure vessel, said internal space containing a sealing device;

said sealing device being pressed against an O-ring at one end to seal the threaded neck opening in the housing, the sealing device having another end pressed tight against the fusible composite alloy in the cavity, said cavity holding said composite alloy, said cavity having a roughened wall structure being selected from the group consisting of a threaded wall, rugged wall, and nonslipping wall; and said composite alloy filling the cavity, said composite alloy being a mixture of fusible alloy matrix and reinforcing agents.

2. The fuse plug of claim 1, wherein said sealing device consists of a stem and a sealing plate with its stem being supported by the composite alloy in the cavity and the sealing is achieved by an O-ring when the sealing device is pressed against the mating vessel or valve, said sealing device being pushed away from the sealing engagement when the composite alloy in the cavity cannot support the stem of said sealing device when the alloy fuses.

3. The fuse plug of claim 1, wherein said sealing device consists of a stem being supported by the composite alloy in the cavity and the sealing is achieved with said O-ring on stem rod facing a mating pressure vessel port, said O-ring being in sealing engagement within an internal cavity space of said fuse plug by being positioned between the threaded neck opening and the stem rod of the sealing device, additional sealing being achieved with a sealing gasket between a shoulder of said fuse plug at the port and a mating body being selected from the group consisting of a valve, a cylinder, and other pressurized hardwares.

4. The fuse plug of claim 1, wherein the material of said reinforcing agent is selected from the group consisting of iron, nickel, chromium, copper, titanium, refractory metals, their base alloys, any copper or nickel-coated metals, any copper or nickel-coated plastics, any copper or nickel-coated ceramics, and any strong plastics, ceramics, or metals coated with bondable metals other than copper or nickel.

5. The fuse plug of claim 1, wherein said reinforcing agent is coated with bondable metals selected from the group comprised of nickel, copper, tin, bismuth, lead, cadmium, silver, gold, titanium, chromium, antimony, zinc, their base alloys, and any other bondable metals.

6. The fuse plug of claim 1, wherein the length of the cavity is greater than the diameter of the cavity.

7. The fuse plug of claim 1, wherein said fuse plug is coated with the element selected from the group consisting of tin, nickel, chromium, titanium, zinc, molybdenum, gold, silver, or any other coatings resistant to stress corrosion.

8. The fuse plug of claim 1, wherein the material of said fuse plug is selected from the group consisting of bronze, brass, stainless steel, copper, chromium, nickel, cobalt, refractory metals, their base alloys, and other materials resistant to stress corrosion cracking.

9. The fuse plug of claim 1, wherein said fusible alloy is a low melting alloy comprised of elements selected from the group consisting of tin, bismuth, lead, cadmium, gallium, indium, silver, copper, and antimony.

10. The fuse plug of claim 1, wherein said reinforcing agent is not coated with any materials.

11. The fuse plug of claim 1, wherein said fuse plug is not coated with any materials.

12. A thermally activated pressure relief fuse plug housing for protecting pressure vessels or pressurized hardwares, said fuse plug housing being free of leakage, said fuse plug being made by the steps of:

forming a plug cavity bondable to a mixture of fusible alloy and reinforcing agent, said reinforcing agent being selected from the group consisting of cut-wire shots of nonspherical shape, cut-wire aggregates, cut-wire shavings, cut-wire cylinders, and cut-wire type very short fibers, said fusible alloy being a low-melting alloy comprised of elements selected from the group consisting of tin, bismuth, lead, cadmium, gallium, indium, silver, copper, and antimony;

filling said plug cavity with said mixture of fusible alloy and reinforcing agents, said cavity having a wall structure being selected from the group consisting of a threaded wall, a rugged wall, and a nonslipping wall;

exerting a force on said mixture; and allowing said mixture to solidify.

13. A tee hardware having a first straight section and a second straight section perpendicular to the first straight section, the tee hardware being disposed within an internal cavity of a fusible plug housing having at one end a primary venting opening, at another end an opening filled with a pressure relief fuse plug, and a third end having a threaded neck opening for a pressure vessel, the tee hardware having the first straight section connected to the opening containing the fuse plug and the second straight section having a primary venting opening and the third end of the first straight section sealingly closing the threaded neck opening in the fuse plug housing.

14. The tee hardware of claim 13, wherein another end of the first straight section of tee is sealingly closed by a cap or plug.

15. The tee hardware of claim 13, wherein the first straight section of the tee is in the extended direction of the straight cavity of pressure relief fuse plug.

16. The tee hardware of claim 13, wherein another end of the first straight section of tee is sealingly closed by a secondary venting tube, the geometry of said secondary venting tube being selected from the group comprised of a snail, spiral, helix, multiple angles, multiple tees, circle, zig-zag path, half circle, their combinations, and other non-straight configurations.

17. A thermally activated pressure relief fuse plug apparatus for use with a pressure vessel or pressurized hardwares, the fuse plug apparatus comprising:

a fuse plug body containing a hollow internal space, a gas venting port, an inlet for communication with an interior of a pressure vessel, and a fuse plug housing;

a sealing device in said hollow internal space between an inlet and outlet venting port for sealing a pressurized gas line;

a fusible composite alloy filling a cavity of said fuse plug housing, said composite alloy being comprised of fusible alloy matrix and reinforcing agents, said reinforcing agents being selected from the group consisting of shots, particles, cut-wire shots, cylinders, cubes, and aggregates, said cavity having a roughened wall structure being selected from the group consisting of a threaded wall, and nonslipping wall, said fuse plug housing being located at an end of said sealing device with the sealing device being supported by the fusible composite alloy, and said sealing device moving away from an inlet port when the fusible alloy fuses in order to vent a pressurized gas through the venting port.

18. A tee hardware having a first straight section and a second straight section at an angle to the first straight section, the tee hardware being disposed within an internal cavity of a fuse plug housing having at one end a primary venting opening, at another end an opening filled with a pressure relief fuse plug, and a third end having a threaded neck opening for a pressure vessel, the tee hardware having the first straight section connected to the opening containing the fuse plug and the second straight section having primary venting opening and the third end of the first straight section sealingly closing the threaded neck opening in the fuse plug housing.

* * * * *